United States Patent Office.

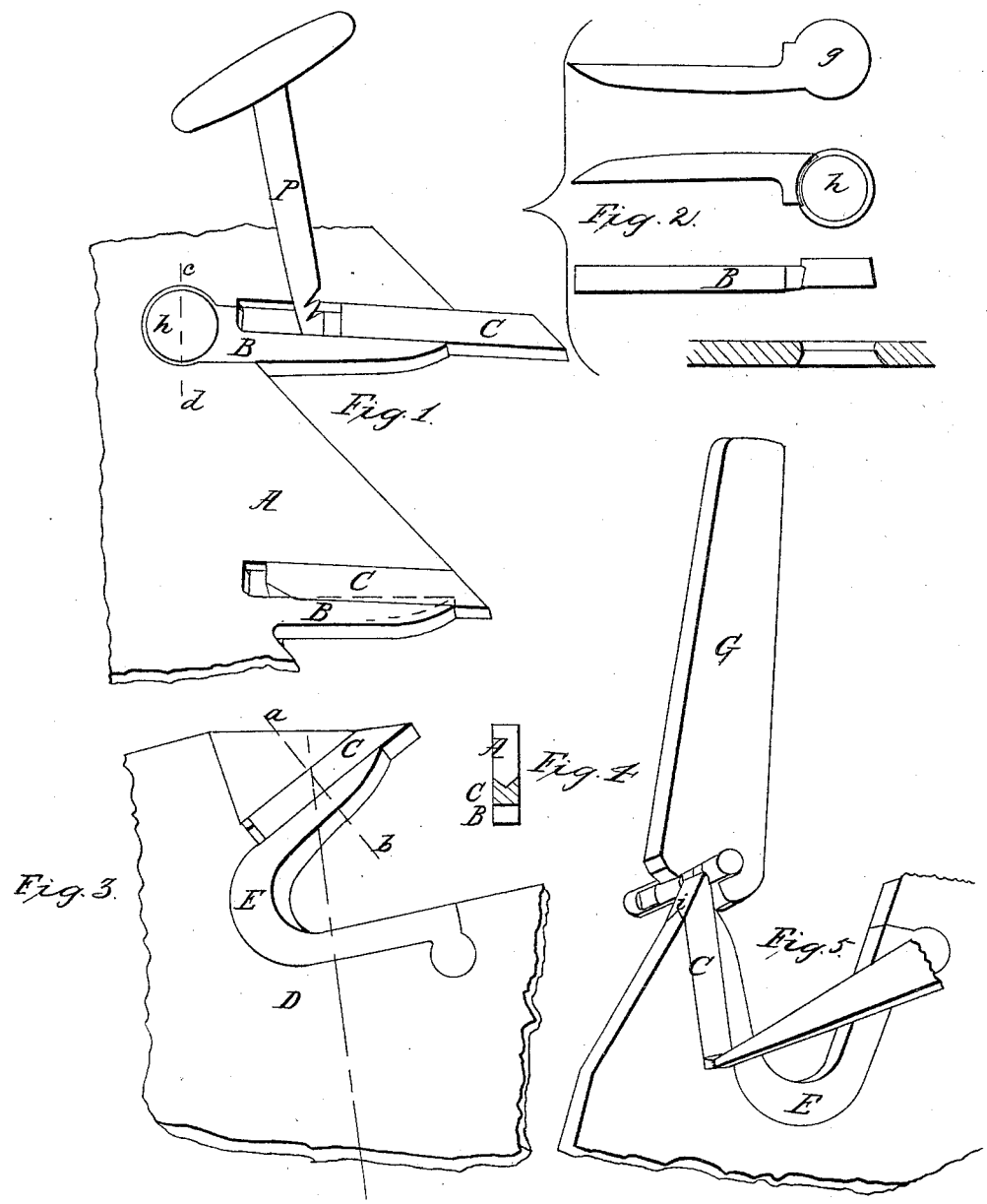

J. E. EMERSON, OF TRENTON, NEW JERSEY.

Letters Patent No. 63,232, dated March 26, 1867.

---

IMPROVEMENT IN SAWS.

---

The Schedule referred to in these Letters Patent and making part of the same.

---

TO ALL WHOM IT MAY CONCERN:

Be it known that I, J. E. EMERSON, of Trenton, in the State of New Jersey, have invented certain new and useful improvements in Methods of Attaching and Retaining Adjustable Teeth or Cutters in Saws and other Implements for Cutting Wood; and I do hereby declare the following to be a full and exact description of the same, reference being had to the drawings that accompany and form a part of these specifications, in which—

Figure 1 is a view in perspective of a section of a vertical saw.

Figure 2, different views of the spring used to hold or secure the tooth in place.

Figure 3, view of a section of a circular saw in perspective.

Figure 4, sectional view, showing view of plate, tooth, and spring, cut on the line $a\ b$.

Figure 5, view of method of keeping the tooth or cutter in place by the use of the key F, while swaging the cutting part of the tooth.

Letter A, saw-plate.

Letter B, view of spring which holds the tooth firmly at the desired position.

Letter C, view of the tooth or cutter in place for use.

Letter D, portion of circular-saw plate, the red line indicating a radius.

Letter E, a spring somewhat different from the spring B.

Letter F, wedge-key used to keep the tooth in place when the swage is used.

Letter G, swage used in spreading and forming the cutting part of the teeth.

Letters $g$ and $h$, the two opposite faces of the head of the spring B.

Letter $i$, groove in one side of the tooth C, which is filled by the counter-rib on the edge of the attaching portion of the saw-plate.

Letter $j$, section on a line $c\ d$, showing the bevel or countersink of the opening for the head of the spring B.

The object of my invention is to provide a convenient and desirable way of attaching teeth to saws and other implements for cutting or grooving and otherwise working wood, and in such manner as to have facilities for replacing an imperfect or broken tooth, or for adjusting any of the teeth or cutters, so that the cutting part thereof may range all on the same line or circle.

The spring B, when the tooth C is not in position, will assume the position indicated by the red lines in fig. 1.

The inner end of the teeth may be made with a bevel, as C', in fig. 1, so they may be inserted between the point of the spring and the jaw $m$ of the saw-plate, and then driven into their place, or the key P may be used, as indicated in fig. 1, for throwing back the point of the spring to provide for the insertion of the end of the tooth C.

The spring B pressing against the tooth C keeps the groove on the side thereof pressed closely on to the fitted edge of the plate A, and holds the tooth securely. So also is the spring E equally effectual, although of different shape.

It will be seen by the sectional view cut on the line $c\ d$, that the opening for the head of the spring B is countersunk slightly on both sides. The head of the spring is made with a bevel, as shown in fig. 2. The face $g$ will come flush with the face of the saw; the other surface $h$ will extend a little beyond the surface of the saw-plate, and is hammered down until the tooth is firm and close in its place.

In putting in the teeth E I usually countersink the opening for the head on both sides, and then hammer down the ends on both sides until the spring is made firm and immovable in its place.

I do not confine myself to any particular form of the springs or manner of fastening them to the saw plate.

These springs may be a little thicker than the saw-plate, or they may be of the same thickness. In attaching them they may be brazed, or firmly attached to the plate in any secure manner.

When it may be thought desirable to have the spring of the same thickness as the saw-plate, it may be a part of the saw-plate itself, a slot being made therein, at its inner end, of the same width as the tooth, and the outer end less than the tooth, which would be sprung back for entering the tooth by the use of the key P. Such a spring is B', in fig. 1.

I have already intimated the advantage of having these teeth adjustable, in the facility obtained for arranging the cutting edges all on the same line.

A great saving of time will be secured by having an extra set of teeth constantly on hand, which may be fitted and sharpened ready for use at any time, so as to require the saw to be stopped but a few minutes for their insertion.

In upright saws the teeth along the central portion thereof are worn away faster than the teeth near the ends; so that these latter teeth, although perfect, have often to be cut and filed away, to a considerable extent, in order to keep the cutting edges throughout the entire length of the saw on a line. Thus my invention provides for a much longer continuance in use of the saw-plate, more perfect work while running, and less loss of time in keeping the saw in running order.

This manner of setting the teeth will be found advantageous in grooving machines and others for similar uses.

What I claim as my invention, and desire to secure by Letters Patent, is—

1. The springs, as shown at B or E, either as a part of the saw-plate itself, or made separate, and firmly attached and fastened to the saw-plate or cutter disk, when used for holding the teeth or cutters as herein described.

2. I claim the combination of the saw-plate and the springs, as shown at B or E, when made separate from said plate, with the tooth C, when fitted and arranged substantially as described and for the purposes set forth.

J. E. EMERSON.

Witnesses:
   D. C. CULLEY,
   CHAS. H. POOLE.